United States Patent
Wang et al.

(10) Patent No.: US 11,146,776 B2
(45) Date of Patent: Oct. 12, 2021

(54) DEVICE AND METHOD FOR THREE-DIMENSIONAL LASER IMAGING WITH LONGITUDINAL RANGE

(71) Applicant: Xidian University, Xi'an (CN)

(72) Inventors: Shiyu Wang, Xi'an (CN); Defang Cai, Xi'an (CN); Mengyao Wu, Xi'an (CN); Zhen Guo, Xi'an (CN)

(73) Assignee: Xidian University

(*) Notice: Subject to any disclaimer, the term of this patent is extended or adjusted under 35 U.S.C. 154(b) by 0 days.

(21) Appl. No.: 16/990,080

(22) Filed: Aug. 11, 2020

(65) Prior Publication Data

US 2021/0058607 A1 Feb. 25, 2021

(30) Foreign Application Priority Data

Aug. 22, 2019 (CN) .......................... 201910780039.2

(51) Int. Cl.

| | |
|---|---|
| *H04N 13/254* | (2018.01) |
| *H04N 13/296* | (2018.01) |
| *G01S 17/894* | (2020.01) |
| *G01S 17/42* | (2006.01) |
| *H04N 5/235* | (2006.01) |

(52) U.S. Cl.
CPC ........... *H04N 13/254* (2018.05); *G01S 17/42* (2013.01); *G01S 17/894* (2020.01); *H04N 5/2353* (2013.01); *H04N 13/296* (2018.05)

(58) Field of Classification Search
CPC .. H04N 13/254; H04N 13/296; H04N 5/2353; G01S 17/894; G01S 17/42; G01S 17/18; G01S 17/89; G01B 11/24
See application file for complete search history.

(56) References Cited

U.S. PATENT DOCUMENTS

| | | | | |
|---|---|---|---|---|
| 2009/0040513 A1* | 2/2009 | Abe | .................. | G01N 21/95607 356/237.5 |
| 2013/0087718 A1* | 4/2013 | Mei | ..................... | G01N 21/6458 250/458.1 |
| 2014/0347445 A1* | 11/2014 | Yoon | ....................... | G01S 7/481 348/46 |
| 2018/0176496 A1* | 6/2018 | Nakamura | ............. | H04N 5/353 |

* cited by examiner

*Primary Examiner* — Jared Walker
(74) *Attorney, Agent, or Firm* — Lambert Shortell & Connaughton; David J. Connaughton, Jr.; Justin P. Tinger

(57) ABSTRACT

The present invention relates to a device and method for 3D laser imaging with a longitudinal range. An optical sensor array detects a 3D image of a target through a delay difference of laser transmission between pixels. During detection, two or more identical laser pulses are sequentially emitted to the target. Each time when a pulse is emitted, a gray image of the target is formed, and multiple pulses form multiple images. By controlling a shutter, the laser pulse returned in each imaging is truncated to varying degrees, and several charge coupled device (CCD) images with different exposures are obtained. A time-varying gray curve of each pixel is extracted, and a waveform of the corresponding laser pulse is restored. A position of a pulse peak of each pixel on a time coordinate is determined to obtain the distribution of the laser delay difference between the pixels, thereby realizing 3D imaging.

8 Claims, 1 Drawing Sheet

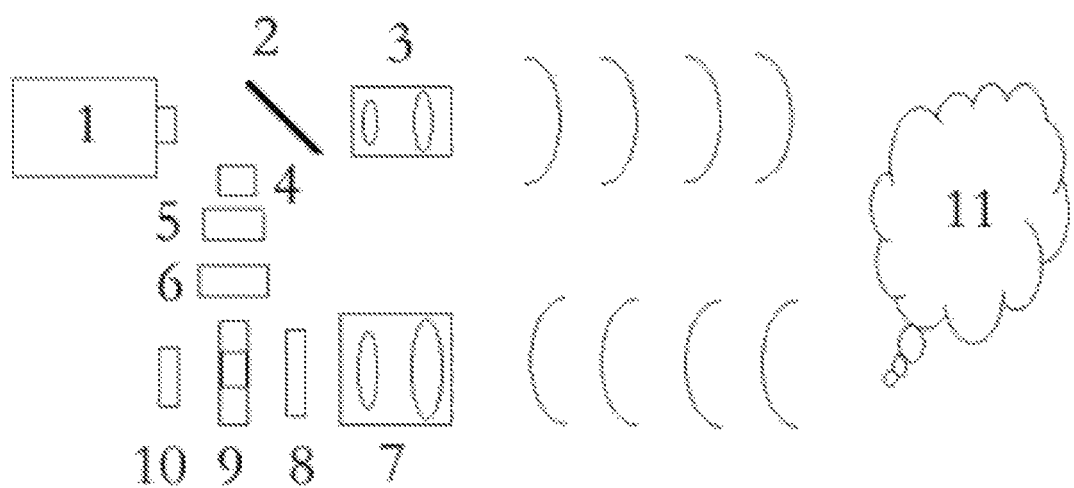

DEVICE AND METHOD FOR THREE-DIMENSIONAL LASER IMAGING WITH LONGITUDINAL RANGE

TECHNICAL FIELD

The present invention relates to the field of three-dimensional (3D) laser imaging, in particular to a device and method for 3D laser imaging with a longitudinal range.

BACKGROUND

At present, the three-dimensional (3D) measurement of long-range targets is mainly carried out by laser scanning stereo imaging, binocular stereo imaging and laser pulse staring stereo imaging.

Laser scanning stereo imaging uses a laser beam to scan the target point by point, uses a single photodiode (PD) or avalanche photodiode (APD) to receive, and calculates the range parameter of the scanning point through the round-trip time (RTT) of the optical pulse in space. In this imaging system, each pixel corresponds to the same actual size and spot size. For short-range targets, due to the small spot size, the spatial resolution can still reach a relatively good level, while for long-range targets, due to the large spot divergence, the spatial resolution becomes very poor. This imaging system has certain value for the measurement of long-range large targets, but it is almost impossible to make fine measurements for long-range small targets.

Binocular stereo imaging uses two cameras to photograph the same object from different angles, and obtains the 3D distribution data of the object through geometric operations. This stereo imaging technique is not practical for long-range targets. In order for the cameras to achieve a better stereo imaging effect on long-range targets, it is necessary to separate the two cameras laterally by a great range. This is difficult to achieve in many cases, and even if it is achieved, the range resolution is greatly compromised due to the registration error between pixels.

Laser pulse staring stereo imaging has become the most promising technique for high-precision 3D measurement of long-range targets. It mainly includes pulsed laser 3D imaging based on PD or APD array detection, 3D imaging based on pulsed laser range gating and 3D laser imaging based on pulsed light polarization modulation.

The 3D pulsed laser imaging based on PD or APD array detection arranges PDs or APDs into a two-dimensional (2D) array or a one-dimensional (1D) array, and images the target on the array through an optical lens. Each single tube in the array corresponds to a pixel, and receives the optical signal scattered back by the target after the laser pulse is emitted. The RTT of the optical pulse is recorded, and the range of the point on the target corresponding to each single tube is calculated accordingly, so as to obtain the target range image.

The APD array-based 3D imaging technique has the disadvantage that the best resolution of the current experimental prototype is only 256×256 pixels and the pixel pitch is large. The consistency of the photoelectric performance between the single tubes in the array is poor, which brings a relatively large range resolution error. At the same time, the range measurement accuracy of each single tube is also limited by the laser pulse width. At present, the range resolution between pixels reaches 0.1-0.5 m.

The 3D imaging technique based on pulsed laser range gating combines a pulse laser with a range gate imager. Only when the range gate of the imager is opened, the laser pulse reflected by the target can enter the array detector for imaging. During the imaging process, the pulsed laser and the range gate are synchronized according to the imaging range. At $t_1$, the laser emits a laser pulse, and the gate is closed. After a period of time, when the reflected laser pulse of a specific range arrives (at $t_2$), the gate is opened to receive the returned pulsed laser and perform imaging.

The main disadvantage of the range-gated 3D imaging technique is that the width of the laser pulse and the width of the wave gate both affect the range imaging accuracy. The longitudinal range resolution is in the same order of magnitude as the larger of the two widths. In addition, the number of 2D images required for 3D imaging is greater than or equal to the ratio of depth of field (DOF) to the range resolution, and the number is very large in the case of long DOF and high-precision measurement.

In the 3D laser imaging based on pulsed light polarization modulation, a polarizer is placed in front of the imaging system to select polarized light in a specific direction, and a Pockels cell is placed behind to rotate the vibration direction of linearly polarized light. A saw wave is usually added to the Pockels cell, making the rotation angle of the linearly polarized light a function of time. The linearly polarized light is decomposed into two components whose polarization directions are perpendicular to each other. The two components enter two cameras respectively, thereby obtaining the ratio of signals in the two polarization directions. The ratio of the components at the two polarization directions of the echo signal returning at different times from the starting point of the saw wave is different. Therefore, the range information of the target point can be obtained from the signal ratio of the corresponding pixels of the two cameras. The cameras use an array detector to perform similar processing on the signals of each pixel to obtain the target range image from a single laser pulse.

The main disadvantage of polarization modulation-based 3D laser imaging is that the accuracy of range measurement depends on the width of the laser pulse. At present, for long-range targets, the range resolution is about 1-30 m. In addition, the rate of change (ROC) of the saw wave affects both the DOF and the range resolution of range measurement. A greater ROC of the saw wave leads to a better range resolution but a smaller DOF.

SUMMARY

In order to overcome the shortcomings of the existing three-dimensional (3D) imaging, the present invention provides a device and method for 3D laser imaging with a longitudinal range.

An objective of the present invention is implemented by a device for three-dimensional (3D) laser imaging with a longitudinal range, including at least: a pulse laser a laser beam splitter, a laser emitting lens, a photodetector, an image processing unit (IPU), a shutter control module (SCM), an imaging lens, an optical filter, an electronically controlled shutter and an optical sensor array, where the pulse laser the laser beam splitter, the laser emitting lens, the photodetector, the IPU, the SCM, the imaging lens, the optical filter, the electronically controlled shutter and the optical sensor array are fixed in a housing; the pulse laser and the imaging lens are aligned with the imaging target, and the pulse laser emits a first laser pulse to the imaging target via the laser emitting lens; a region of the imaging target closest to the imaging lens reflects a part of light back to the imaging lens, and this part of light is imaged onto a plane of the optical sensor array by the imaging lens and the electronically controlled shutter; the IPU controls the electronically controlled shutter to shut off via the SCM, and the IPU stores a first image of the region of the imaging target closest to the imaging lens;

the pulse laser emits a second laser pulse to the imaging target via the laser emitting lens; a region of the imaging target closer to the imaging lens reflects a part of light back to the imaging lens, and this part of light is imaged onto the plane of the optical sensor array by the imaging lens and the electronically controlled shutter; the IPU controls the electronically controlled shutter to shut off via the SCM, and the IPU stores a second image of the region of the imaging target closer to the imaging lens;

the pulse laser emits an N-th laser pulse to the imaging target via the laser emitting lens; a region of the imaging target farther to the imaging lens reflects a part of light back to the imaging lens, and this part of light is imaged onto the plane of the optical sensor array by the imaging lens and the electronically controlled shutter; the IPU controls the electronically controlled shutter to shut off via the SCM, and the IPU stores an N-th image of the region of the imaging target farther to the imaging lens;

the pulse laser emits an (N+1)-th laser pulse to the imaging target via the laser emitting lens; a region of the imaging target farthest to the imaging lens reflects a part of light back to the imaging lens, and this part of light is imaged onto the plane of the optical sensor array by the imaging lens and the electronically controlled shutter; the IPU controls the electronically controlled shutter to shut off via the SCM, and the IPU stores an (N+1)-th image of the region of the imaging target farthest to the imaging lens;

the IPU processes the stored images of different ranges to output an image of the imaging target covering different regions of longitudinal ranges.

The filter is provided at a rear or front end of the imaging lens to filter optical signals other than a wavelength of a light wave emitted by the pulse laser so that only the wavelength of the light wave emitted by the pulse laser is imaged.

The photodetector is provided on a reflective optical path of the laser beam splitter, and the photodetector detects a small amount of reflected light of the light emitted by the pulse laser to obtain a starting time of the pulse laser emitting light.

The emitting lens is provided on an output optical path of the laser beam splitter.

A method for 3D laser imaging with a longitudinal range includes at least the following steps:

(1) first irradiating a target with pulsed laser, allowing the target to reflect an echo signal to a time sequence of a sensor array; controlling a camera shutter at a front end of the sensor array to shut off at an off time;

(2) controlling the camera shutter at the front end of the sensor array to shut off: shutting off the shutter when the echo signal has not completely returned to an imaging plane; truncating an echo light pulse, and obtaining a gray image formed by the truncated pulse through an optical sensor; using a sending time of the laser pulse as a zero point of a time coordinate to mark the shutter off time;

(3) setting the shutter off time to be delayed by a fixed time interval $\Delta t$ after the laser irradiates the target;

(4) keeping the laser irradiation target unchanged, repeating steps (1) and (3) by accumulating $\Delta t$, acquiring a gray image each time $\Delta t$ is added, and using the sending time of the laser pulse at each time of imaging as a timing zero point;

(5) arranging the images according to a time sequence of photographing, starting from a $2^{nd}$ image to subtract a gray value of each pixel of each image in a previous image from a gray value of the pixel, and obtaining a time-varying gray curve of each pixel from differences;

(6) using a waveform function $F(t)$ of the laser pulse or a modulated waveform function $F_v(t)$ as a template to match the gray change curve of each pixel and restore a waveform of the laser pulse echo signal received by the pixel, and determining a position of a peak of the waveform on the time coordinate, where the zero point of the coordinate is the sending time of the laser pulse;

(7) setting a coordinate of the peak of the determined waveform of each pixel to be $t_1, t_2, \ldots, t_n$, respectively, and obtaining a delay difference between the pixels as $\Delta t_1 = t_1 - t_1 = 0, \Delta t_2 = t_2 - t_1, \ldots, \Delta t_n = t_n - t_1$, respectively; and (8) obtaining a relative range of each target point as $s_1 = 0$, $s_2 = c^* \Delta t_2/2, \ldots s_n = c^* \Delta t_n/2$, respectively, according to the waveform peak coordinate of each pixel and the delay difference between the pixels obtained in step (7).

When the shutter off time is negligible, the original waveform function $F(t)$ of the laser pulse is used, and when the shutter off time is not negligible, the modulated waveform function $F_v(t)$ including shutter modulation information is used.

The $\Delta t$ is equal to $\tau/3 - \tau/5$, $\tau$ being a width of the pulse laser.

The photodetector is a charge coupled device (CCD) or complementary metal-oxide-semiconductor transistor (CMOS) optical sensor.

In the present invention, pulsed laser is used as an irradiation source. An optical sensor array detects a 3D image of a target through a delay difference of laser transmission between pixels. During detection, two or more identical laser pulses are sequentially emitted to the target. Each time when a pulse is emitted, a gray image of the target is formed, and multiple pulses form multiple images. By controlling a shutter, the laser pulse returned in each imaging is truncated to varying degrees, and several charge coupled device (CCD) images with different exposures are obtained. A time-varying gray curve of each pixel is extracted, and a waveform of the corresponding laser pulse is restored. A position of a pulse peak of each pixel on a time coordinate is determined to obtain the distribution of the laser delay difference between the pixels, thereby realizing 3D imaging.

Compared with optical imaging, the present invention avoids the requirement for depth of field (DOF).

Compared with 3D laser imaging based on pulsed light polarization modulation, the present invention is free from the rate of change (ROC) of a saw wave, which affects the DOF and range resolution of range measurement.

Compared with laser scanning stereo imaging, the present invention has no problems of spot divergence and poor spatial resolution for long-range targets, and can also effectively detect short-range targets.

Compared with 3D imaging based on pulsed laser range gating, the present invention does not have the problem that the width of the laser pulse and the width of the wave gate both affect the accuracy of range imaging.

BRIEF DESCRIPTION OF DRAWINGS

The present invention is further described below with reference to the specific examples and accompanying drawings.

FIG. 1 is a structural view of an example of the present invention.

Reference Numerals: 1. pulse laser; 2. laser beam splitter; 3. laser emitting lens; 4. photodetector; 5. image processing unit (IPU); 6. shutter control module (SCM); 7. imaging lens; 8. filter; 9. electronically controlled shutter; 10. optical sensor array; and 11. imaging target.

DETAILED DESCRIPTION

As shown in FIG. 1, a device for three-dimensional (3D) laser imaging with a longitudinal range includes at least: a pulse laser 1, a laser beam splitter 2, a laser emitting lens 3, a photodetector 4, an image processing unit (IPU) 5, a shutter control module (SCM) 6, an imaging lens 7, an optical filter 8, an electronically controlled shutter 9 and an optical sensor array 10. The pulse laser 1, the laser beam splitter 2, the laser emitting lens 3, the photodetector 4, the IPU 5, the SCM 6, the imaging lens 7, the optical filter 8, the electronically controlled shutter 9 and the optical sensor array 10 are fixed in a housing. The pulse laser 1 and the imaging lens 7 are aligned with the imaging target 11, and the pulse laser 1 emits a first laser pulse to the imaging target 11 via the laser emitting lens 3. A region of the imaging target 11 closest to the imaging lens 7 reflects a part of light back to the imaging lens 7, and this part of light is imaged onto a plane of the optical sensor array 10 by the imaging lens 7 and the electronically controlled shutter 9. The IPU 5 controls the electronically controlled shutter 9 to shut off via the SCM 6, and the IPU 5 stores a first image of the region of the imaging target 11 closest to the imaging lens 7.

The pulse laser 1 emits a second laser pulse to the imaging target 11 via the laser emitting lens 3. A region of the imaging target 11 closer to the imaging lens 7 reflects a part of light back to the imaging lens 7, and this part of light is imaged onto the plane of the optical sensor array 10 by the imaging lens 7 and the electronically controlled shutter 9. The IPU 5 controls the electronically controlled shutter 9 to shut off via the SCM 6, and the IPU 5 stores a second image of the region of the imaging target 11 closer to the imaging lens 7.

The pulse laser 1 emits an N-th laser pulse to the imaging target 11 via the laser emitting lens 3. A region of the imaging target 11 farther to the imaging lens 7 reflects a part of light back to the imaging lens 7, and this part of light is imaged onto the plane of the optical sensor array 10 by the imaging lens 7 and the electronically controlled shutter 9. The IPU 5 controls the electronically controlled shutter 9 to shut off via the SCM 6, and the IPU 5 stores an N-th image of the region of the imaging target 11 farther to the imaging lens 7.

The pulse laser 1 emits an (N+1)-th laser pulse to the imaging target 11 via the laser emitting lens 3. A region of the imaging target 11 farthest to the imaging lens 7 reflects a part of light back to the imaging lens 7, and this part of light is imaged onto the plane of the optical sensor array 10 by the imaging lens 7 and the electronically controlled shutter 9. The IPU 5 controls the electronically controlled shutter 9 to shut off via the SCM 6, and the IPU 5 stores an (N+1)-th image of the region of the imaging target 11 farthest to the imaging lens 7.

The IPU 5 processes the stored images of different ranges to output an image of the imaging target 11 covering different regions of longitudinal ranges.

In order to protect the imaging effect from being affected by the environment, the filter 8 is provided at a rear or front end of the imaging lens 7 to filter optical signals other than a wavelength of a light wave emitted by the pulse laser 1, so that only the wavelength of the light wave emitted by the pulse laser 1 is imaged.

In order to obtain a starting time when the pulse laser 1 emits light, the photodetector 4 is provided on a reflective optical path of the laser beam splitter 2, and the photodetector 4 detects a small amount of reflected light of the light emitted by the pulse laser 1 to obtain the starting time of the pulse laser 1 emitting light.

In order to obtain the quality of the light emitted by the pulse laser 1 and control a range of a light emitting area to the imaging target 11, the emitting lens 3 is provided on an output optical path of the laser beam splitter 2.

A method for 3D laser imaging with a longitudinal range includes at least the following steps:

(1) first irradiate a target with pulsed laser, allow the target to reflect an echo signal to a time sequence of a sensor array; control a camera shutter at a front end of the sensor array to shut off at an off time;

(2) control the camera shutter at the front end of the sensor array to shut off: shut off the shutter when the echo signal has not completely returned to an imaging plane; truncate an echo light pulse, and obtain a gray image formed by the truncated pulse through an optical sensor; use a sending time of the laser pulse as a zero point of a time coordinate to mark a shutter off time;

(3) set the shutter off time to be delayed by a fixed time interval $\Delta t$ after the laser irradiates the target;

(4) keep the laser irradiation target unchanged, repeat steps (1) and (3) by accumulating $\Delta t$, acquire a gray image each time $\Delta t$ is added, and use the sending time of the laser pulse at each time of imaging as a timing zero point;

(5) arrange the images according to a time sequence of photographing, start from a $2^{nd}$ image to subtract a gray value of each pixel of each image in a previous image from a gray value of the pixel, and obtain a time-varying gray curve of each pixel from differences;

(6) use a waveform function F(t) of the laser pulse or a modulated waveform function $F_v(t)$ as a template to match the gray change curve of each pixel and restore a waveform of the laser pulse echo signal received by the pixel, and determine a position of a peak of the waveform on the time coordinate, where the zero point of the coordinate is the sending time of the laser pulse;

(7) set a coordinate of the peak of the determined waveform of each pixel to be $t_1, t_2, \ldots, t_n$, respectively, and obtain a delay difference between the pixels as $\Delta t_1 = t_1 - t_1 = 0$, $\Delta t_2 = t_2 - t_1, \ldots, \Delta t_n = t_n - t_1$, respectively; and (8) obtain a relative range of each target point as $s_1 = 0$, $s_2 = c^* \Delta t_2/2, \ldots, s_n = c^* \Delta t_n/2$, respectively, according to the waveform peak coordinate of each pixel and the delay difference between the pixels obtained in step (7).

When the shutter off time is negligible, the original waveform function F(t) of the laser pulse is used, and when the shutter off time is not negligible, the modulated waveform function $F_v(t)$ including shutter modulation information is used.

The $\Delta t$ is equal to $\tau/3 - \tau/5$, $\tau$ being a width of the pulse laser.

The detector is a charge coupled device (CCD) or complementary metal-oxide-semiconductor transistor (CMOS) optical sensor.

The components and structures that are not detailed herein are well-known components and common structures or common means in the industry, and are omitted here.

What is claimed is:

1. A device for three-dimensional (3D) laser imaging with a longitudinal range, comprising at least: a pulse laser (1), a laser beam splitter (2), a laser emitting lens (3), a photodetector (4), an image processing unit (IPU) (5), a shutter control module (SCM) (6), an imaging lens (7), an optical filter (8), an electronically controlled shutter (9) and an optical sensor array (10), wherein the pulse laser (1), the laser beam splitter (2), the laser emitting lens (3), the photodetector (4), the IPU (5), the SCM (6), the imaging lens (7), the optical filter (8), the electronically controlled shutter (9) and the optical sensor array (10) are fixed in a housing; the pulse laser (1) and the imaging lens (7) are aligned with the imaging target (11), and the pulse laser (1) emits a first laser pulse to the imaging target (11) via the laser emitting lens (3); a region of the imaging target (11) closest to the imaging lens (7) reflects a part of light back to the imaging lens (7), and this part of light is imaged onto a plane of the optical sensor array (10) by the imaging lens (7) and the electronically controlled shutter (9); the IPU (5) controls the electronically controlled shutter (9) to shut off via the SCM (6), and the IPU (5) stores a first image of the region of the imaging target (11) closest to the imaging lens (7);

the pulse laser (1) emits a second laser pulse to the imaging target (11) via the laser emitting lens (3); a region of the imaging target (11) closer to the imaging lens (7) reflects a part of light back to the imaging lens (7), and this part of light is imaged onto the plane of the optical sensor array (10) by the imaging lens (7) and the electronically controlled shutter (9); the IPU (5) controls the electronically controlled shutter (9) to shut off via the SCM (6), and the IPU (5) stores a second image of the region of the imaging target (11) closer to the imaging lens (7);

the pulse laser (1) emits an N-th laser pulse to the imaging target (11) via the laser emitting lens (3); a region of the imaging target (11) farther to the imaging lens (7) reflects a part of light back to the imaging lens (7), and this part of light is imaged onto the plane of the optical sensor array (10) by the imaging lens (7) and the electronically controlled shutter (9); the IPU (5) controls the electronically controlled shutter (9) to shut off via the SCM (6), and the IPU (5) stores an N-th image of the region of the imaging target (11) farther to the imaging lens (7);

the pulse laser (1) emits an (N+1)-th laser pulse to the imaging target (11) via the laser emitting lens (3); a region of the imaging target (11) farthest to the imaging lens (7) reflects a part of light back to the imaging lens (7), and this part of light is imaged onto the plane of the optical sensor array (10) by the imaging lens (7) and the electronically controlled shutter (9); the IPU (5) controls the electronically controlled shutter (9) to shut off via the SCM (6), and the IPU (5) stores an (N+1)-th image of the region of the imaging target (11) farthest to the imaging lens (7);

the IPU (5) processes the stored images of different ranges to output an image of the imaging target (11) covering different regions of longitudinal ranges.

2. The device for 3D laser imaging with a longitudinal range according to claim 1, wherein the filter (8) is provided at a rear or front end of the imaging lens (7) to filter optical signals other than a wavelength of a light wave emitted by the pulse laser (1), so that only the wavelength of the light wave emitted by the pulse laser (1) is imaged.

3. The device for 3D laser imaging with a longitudinal range according to claim 1, wherein the photodetector (4) is provided on a reflective optical path of the laser beam splitter (2), and the photodetector (4) detects a small amount of reflected light of the light emitted by the pulse laser (1) to obtain a starting time of the pulse laser (1) emitting light.

4. The device for 3D laser imaging with a longitudinal range according to claim 1, wherein the emitting lens (3) is provided on an output optical path of the laser beam splitter (2).

5. The device for 3D laser imaging with a longitudinal range according to claim 1, wherein the photodetector is a charge coupled device (CCD) or complementary metal-oxide-semiconductor transistor (CMOS) optical sensor.

6. A method for 3D laser imaging with a longitudinal range, comprising at least the following steps:
(1) first irradiating a target with pulsed laser, allowing the target to reflect an echo signal to a time sequence of a sensor array; controlling a camera shutter at a front end of the sensor array to shut off at an off time;
(2) controlling the camera shutter at the front end of the sensor array to shut off: shutting off the shutter when the echo signal has not completely returned to an imaging plane; truncating an echo light pulse, and obtaining a gray image formed by the truncated pulse through an optical sensor; using a sending time of the laser pulse as a zero point of a time coordinate to mark the shutter off time;
(3) setting the shutter off time to be delayed by a fixed time interval $\Delta t$ after the laser irradiates the target;
(4) keeping the laser irradiation target unchanged, repeating steps (1) and (3) by accumulating $\Delta t$, acquiring a gray image each time $\Delta t$ is added, and using the sending time of the laser pulse at each time of imaging as a timing zero point;
(5) arranging the images according to a time sequence of photographing, starting from a $2^{nd}$ image to subtract a gray value of each pixel of each image in a previous image from a gray value of the pixel, and obtaining a time-varying gray curve of each pixel from differences;
(6) using a waveform function $F(t)$ of the laser pulse or a modulated waveform function $F_v(t)$ as a template to match the gray change curve of each pixel and restore a waveform of the laser pulse echo signal received by the pixel, and determining a position of a peak of the waveform on the time coordinate, wherein the zero point of the coordinate is the sending time of the laser pulse;
(7) setting a coordinate of the peak of the determined waveform of each pixel to be $t_1, t_2, \ldots, t_n$, respectively, and obtaining a delay difference between the pixels as $\Delta t_1 = t_1 - t_1 = 0$, $\Delta t_2 = t_2 - t_1$, ..., $\Delta t_n = t_n - t_1$, respectively; and
(8) obtaining a relative range of each target point as $s_1 = 0$, $s_2 = c*\Delta t_2/2, \ldots, s_n = c*\Delta t_n/2$, respectively, according to the waveform peak coordinate of each pixel and the delay difference between the pixels obtained in step (7).

7. The method for 3D laser imaging with a longitudinal range according to claim 6, wherein when the shutter off time is negligible, the original waveform function $F(t)$ of the laser pulse is used, and when the shutter off time is not negligible, the modulated waveform function $F_v(t)$ comprising shutter modulation information is used.

8. The method for 3D laser imaging with a longitudinal range according to claim 6, wherein the $\Delta t$ is equal to $\tau/3 - \tau/5$, $\tau$ being a width of the pulse laser.

* * * * *